United States Patent [19]

Harrison et al.

[11] Patent Number: 4,539,311

[45] Date of Patent: Sep. 3, 1985

[54] PROCESS FOR MAKING A LEAD-TOLERANT CATALYST SYSTEM FOR PURIFYING EXHAUST

[75] Inventors: Brian Harrison; Alan F. Diwell, both of Oxfordshire, England

[73] Assignee: John Matthey Public Limited Company, London, England

[21] Appl. No.: 622,550

[22] Filed: Jun. 20, 1984

[30] Foreign Application Priority Data

Jun. 27, 1983 [GB] United Kingdom ............... 8317380

[51] Int. Cl.$^3$ .................. B01J 21/04; B01J 23/10; B01J 23/78
[52] U.S. Cl. .................. 502/304; 502/328; 423/213.5
[58] Field of Search ............... 502/304, 328; 423/213.5

[56] References Cited

U.S. PATENT DOCUMENTS

| | | | |
|---|---|---|---|
| 3,819,536 | 6/1974 | Dalla Betta et al. | 502/328 X |
| 3,894,140 | 7/1975 | Warshaw | 502/304 X |
| 3,966,391 | 6/1976 | Hindin et al. | 502/302 X |
| 4,279,782 | 7/1981 | Chapman et al. | 502/314 |
| 4,331,565 | 5/1982 | Schaefer et al. | 502/304 |

FOREIGN PATENT DOCUMENTS 55-104652  8/1980  Japan .................. 502/328

*Primary Examiner*—W. J. Shine
*Attorney, Agent, or Firm*—Cushman, Darby & Cushman

[57] ABSTRACT

A process for improving the lead tolerance of a motor vehicle exhaust purification catalyst system of the type comprising a platinum group metal catalyst carried on alumina. The improvement derives from impregnating the alumina with barium moiety and firing at at least 400° C. before subsequent impregnation with the metal catalyst moiety.

5 Claims, No Drawings

PROCESS FOR MAKING A LEAD-TOLERANT CATALYST SYSTEM FOR PURIFYING EXHAUST

This invention relates to a process for making a catalyst system of the type comprising a platinum group metal catalyst carried on supported $\chi$-(chi) or $\gamma$-(gamma) alumina but which is sufficiently lead-tolerant to be suitable for purifying lead-containing exhaust emitted by a petrol (i.e. spark-ignition) engine operating on lead-containing petrol (i.e. gasolene).

Platinum metal catalysts are quickly poisoned by lead moieties and so they have not been used commercially for purifying exhaust emitted by petrol engines operating on lead-containing petrol. Where legislation has required the purification of petrol engine exhaust, it has been necessary to resort to the use of lead-free petrol. Proposals have been made to improve the lead-tolerance of the catalysts by firing the platinum group metal in the presence of barium moiety but the improvements achieved were insufficient to enable the catalysts to be used commercially with lead-containing exhausts.

An object of the present invention is to provide a process for making a catalyst system suitable for use in purifying exhaust emitted from a petrol engine operating on lead-containing petrol.

Accordingly this invention provides a process for making a lead tolerant catalyst system comprising a platinum group metal catalyst carried on supported alumina having a surface area of at least 50 m$^2$/g (preferably 100 to 200 m$^2$/g) wherein the process comprises impregnating the alumina with a dispersion of barium moiety, then subjecting the impregnated alumina to a first post-impregnation firing at a temperature of at least 400° C. and subsequently impregnating the alumina with a dispersion of platinum group metal moiety and then subjecting the impregnated alumina to a second post-impregnation firing at a temperature of at least 400° C. The firing of the barium moiety during the first post-impregnation firing substantially improves the poison resistance of the catalyst even though the platinum metal is not present during this first firing. Preferably both the first and second post-impregnation firings are performed at temperatures above 500° C. but there appears to be no advantage in firing at temperatures above 700° C.

$\chi$- and $\gamma$-aluminas have surface areas of 100 m$^2$/g or more and are therefore widely used as carriers for platinum group metal catalysts. Such high surface area aluminas can be conveniently produced by coating a support with an aqueous dispersion of anhydrous alumina, alumina monohydrate or alumina trihydrate, drying at 100° to 300° C. (preferably 100° to 120° C.) to remove water from the coating and then firing the dried coating at a temperature of from 400° to 700° C. (again preferably 500° to 700° C.). Surface areas of up to 150 m$^2$/g are achievable. The loading of alumina based on the volume of the catalyst system is preferably from 2 to 4 kg/m$^3$. The lead-tolerance of the catalyst system can be further enhanced by the incorporation of ceria particles into the alumina. The ceria can be incorporated by mixing colloidal ceria particles (preferably having a number average particle size of from 1 to 100 nm) with the aqueous dispersion of alumina prior to firing. Preferably the concentration of ceria based on the volume of the catalyst system should be from 1.7 to 10 kg/m$^3$.

Preferred supports for the alumina comprise one or more unitary elongate structures having walls which define passageways through which the exhaust flows during use. Because of the passageways defined by the walls, the structure presents in transverse section the appearance of a honeycomb except that the cells need not be hexagonal and are preferably mainly rectangular. Preferably the number of cells is from 0.3 to 1.0/mm$^2$. The material from which the support is made may be metal or ceramic with a commercially acceptable resistance to corrosion when used in the conditions encountered in the flow of exhaust from a petrol engine. Suitable ceramics include cordierite, cordierite-alpha alumina, silicon nitride, zircon mullite, spodumene, alumina-silica-magnesia or zirconium silicate. Other useful ceramics are disclosed in United States patent specifications U.S. Pat. Nos. 3,565,830, 4,189,404 and 4,206,087 the contents of which specifications are herein incorporated by reference. Suitable metals include ferritic stainless steels, especially those containing aluminium and chromium for example as described in European patent specifications EP No. 033202A and EP No. 033203A to Allegheny Ludlum Steel or U.S. Pat. No. 3,920,583 to the United Kingdom Atomic Energy Authority (Harwell), the contents of which specifications are herein incorporated by reference. A useful support is described in General Motor' British patent specification GB No. 2,079,174A and especially useful oxide-whisker coated metal foils are described in General Motors' British and United States patent specifications namely GB Pat. Nos. 2,063,723A, 2,081,747A, 2,094,656A and U.S. Pat. No. 4,279,782. The contents of all five of these General Motors' specifications are herein incorporated by reference.

The barium moiety is conveniently impregnated into the $\chi$- or $\gamma$-alumina by soaking the alumina in an aqueous solution of a barium compound which decomposes to produce barium oxide on firing at over 400° C. Useful compounds include barium nitrate or barium carboxylates such as barium acetate. It is preferred to dry the soaked alumina by heating to between 100° to 300° C. (preferably 100° to 120° C.) before the first post-impregnation firing. Preferably the concentration of barium moiety based on the weight of alumina is from 1 to 10 wt %.

Likewise the platinum group metal catalyst is conveniently impregnated into the $\chi$- or $\gamma$-alumina by soaking the alumina in an aqueous solution of a metal compound which on firing at over 400° C. decomposes to either the platinum group metal or to a compound which converts to the metal by reacting with exhaust emitted from a petrol engine. Useful metal compounds include chloroplatinic acid or the chlorides of rhodium or palladium. Again it is preferred to dry the soaked alumina at 100° to 300° C. (preferably 100° to 170° C.) before the second post-impregnation firing. The concentration of platinum group metal catalyst base on the volume of the catalyst system is preferably 1.8 to 22 gram atoms/m$^3$.

The noble metals may be used alone as catalysts or they may be used in combination with each other or in combination with base metals, preferably metals of Groups 3b to 8b and Ib of the periodic table, especially nickel, cobalt or copper. More particularly platinum may be used in admixture with from 35% to 70% (by weight of the mixture) of rhodium and/or palladium.

The invention is further illustrated by the following Examples of which Example A is comparative.

EXAMPLE 1

A conventional metal "honeycomb" support made from a ferritic steel containing aluminium and chromium was coated with alumina incorporating ceria by dipping the support into an aqueous dispersion of hydrated alumina and colloidal ceria particles believed to have a number average particle size of from 1 to 100 nm. The coated support was removed from the dispersion and dried at 105° C. for 3 hours. The supported alumina (incorporating the ceria) was subjected to a pre-impregnation firing at 550° C. for 30 minutes.

The supported alumina was allowed to cool to room temperature and was then soaked in an aqueous solution of barium nitrate, then dried as before and subjected to a first post-impregnation firing at 550° C. for 30 minutes. The alumina was allowed to cool to room temperature and then soaked in an aqueous solution of chloroplatinic acid. Drying as before was repeated and then the alumina was subjected to a second post-impregnation firing at 550° C. for 30 minutes.

A catalyst system was obtained which contained 3.05 kg/m$^3$ of γ-alumina., 7.1 kg/m$^3$ of cerium moiety and 7.3 g atoms/m$^3$ of platinum (all based on the volume of the catalyst system) and 4 wt. % of barium moiety based on the weight of the alumina.

The catalyst system was placed in a stream of exhaust gas emitted from a pulsed flame reactor designed to simulate combustion conditions in a petrol engine of the type used in motor vehicles. The reactor burned lead-containing petrol to produce exhaust gas containing 0.4g/liter of lead moiety. The exhaust gas was passed through the channels in the "honeycomb" catalyst system. The main impurities in the exhaust gas were carbon monoxide, methane, ethane and propane and the objective was to oxidise these to carbon dioxide and water.

The performance of the catalyst system was studied when it was freshly made and when it had been operated for 32 hours. The temperature (T50° C.) of the exhaust gas at which 50wt % of an impurity was oxidised was measured and is shown in Table 1. The lower T50 is, the more effective is the catalyst system. The exhaust gas was also pre-heated to 600° C. and the weight percentage combustion of the hydrocarbon impurities was measured and is shown in Table 1.

EXAMPLE A

The procedure of Example 1 was repeated except that the first post-impregnation firing was omitted and the soaking of the alumina with aqueous barium moiety and chloroplatinic acid was performed simultaneously using a solution of a mixture of chloroplatinic acid and barium acetate. The results obtained are shown in Table 1.

Table 1 shows that after 32 hours of operation when the catalyst has been subjected to severe lead poisoning, the catalyst system of Example 1 provides beneficially lower values for T50 for carbon monoxide, methane, ethane and propane and much high weight percentage conversions at 600° C. for all three hydrocarbons.

This invention also provides an exhaust system for a petrol engine (especialy a motor vehicle petrol engine) wherein the exhaust system includes a catalyst system according to this invention.

TABLE 1

| Example | Property Measured | Freshly made catalyst | | | | Catalyst after 32 hours operation | | | |
|---|---|---|---|---|---|---|---|---|---|
| | | CO | CH$_4$ | C$_2$H$_6$ | C$_3$H$_8$ | CO | CH$_4$ | C$_2$H$_6$ | C$_3$H$_8$ |
| 1 | T50 °C. | 185 | 496 | 377 | 294 | 216 | 600 | 546 | 517 |
| A | | 215 | 518 | 396 | 288 | 225 | 600 | 600 | 581 |
| 1 | % Conversion | — | 99.4 | 100 | 100 | — | 44.2 | 67.8 | 74.8 |
| A | when exhaust pre-heated to 600° C. | — | 97.0 | 100 | 100 | — | 25.9 | 48.6 | 57.5 |

We claim:

1. A process for making a lead tolerant catalyst system comprising a catalyst consisting essentially of platinum group metal carried on supported alumina having a surface area of at least 50 m$^2$/g which process comprises impregnating the supported alumina with a solution of a barium compound, subjecting the alumina to an intermediate firing at a temperature of at least 400° C., subsequently impregnating the alumina with a solution of a compound selected from the group consisting of compounds of platinum, palladium and rhodium and then subjecting the alumina to a firing at a temperature of at least 400° C.

2. A process according to claim 1 wherein the intermediate firing is performed at a temperature of from 500° to 700° C.

3. A process according to claim 2 wherein the alumina is chi- or gamma-alumina.

4. A process according to claim 1 wherein the alumina contains ceria particles.

5. A process according to claim 1 wherein the support for the catalyst system comprises oxide-whisker coated metal foils.

* * * * *